United States Patent
Thomason

(10) Patent No.: US 9,078,424 B2
(45) Date of Patent: Jul. 14, 2015

(54) APPARATUS WITH AN EXTERIOR SURFACE SIMULATING A NATURAL SURFACE AND METHOD OF MANUFACTURE

(71) Applicant: Timothy L. Thomason, Kerrville, TX (US)

(72) Inventor: Timothy L. Thomason, Kerrville, TX (US)

(73) Assignee: Nature Blinds, LLC, Kerrville, TX (US)

( * ) Notice: Subject to any disclaimer, the term of this patent is extended or adjusted under 35 U.S.C. 154(b) by 0 days.

(21) Appl. No.: 13/966,170

(22) Filed: Aug. 13, 2013

(65) Prior Publication Data

US 2014/0209138 A1    Jul. 31, 2014

Related U.S. Application Data

(60) Provisional application No. 61/682,554, filed on Aug. 13, 2012.

(51) Int. Cl.
*A01M 31/02* (2006.01)
*B29C 33/38* (2006.01)
*B29C 44/04* (2006.01)
*B29C 44/06* (2006.01)

(52) U.S. Cl.
CPC .......... *A01M 31/025* (2013.01); *B29C 33/3857* (2013.01); *B29C 33/3842* (2013.01); *B29C 44/04* (2013.01); *B29C 44/06* (2013.01); *B29C 2033/3871* (2013.01); *Y10T 29/4998* (2015.01)

(58) Field of Classification Search
CPC ............. A01M 31/025; Y10T 29/4998; B29C 33/3842; B29C 44/04; B29C 44/06; B29C 2033/3871; B29C 33/3857

USPC .......... 29/527.1–527.3, 527.6; 264/45.1, 129, 264/225, 337
See application file for complete search history.

(56) References Cited

U.S. PATENT DOCUMENTS

| | | | | |
|---|---|---|---|---|
| 2,655,489 | A | * | 10/1953 | Dent .............................. 524/267 |
| 2,992,503 | A | * | 7/1961 | Webb .................................. 43/1 |
| 3,137,661 | A | * | 6/1964 | Rose et al. ..................... 521/158 |
| 3,369,949 | A | * | 2/1968 | Forrest .......................... 156/232 |
| 3,989,790 | A | * | 11/1976 | Bruner et al. ................. 264/225 |
| 4,559,189 | A | * | 12/1985 | Wegener, II .................... 264/39 |
| 4,940,558 | A | * | 7/1990 | Jarboe et al. ................. 264/46.7 |
| 5,129,540 | A | * | 7/1992 | Palazzo ...................... 220/62.22 |
| 5,241,772 | A | * | 9/1993 | Hall .................................... 43/1 |
| 5,371,966 | A | * | 12/1994 | Hall .................................... 43/1 |
| 5,376,132 | A | * | 12/1994 | Caspers ........................... 623/36 |
| 5,571,208 | A | * | 11/1996 | Caspers ........................... 623/32 |
| 5,595,701 | A | * | 1/1997 | MacGregor et al. .......... 264/255 |
| 5,677,017 | A | * | 10/1997 | Freeman ......................... 428/17 |
| 5,679,189 | A | * | 10/1997 | Jarboe ............................. 156/61 |

(Continued)

*Primary Examiner* — Jermie Cozart
*Assistant Examiner* — Bayan Salone
(74) *Attorney, Agent, or Firm* — Gunn, Lee & Cave, P.C.

(57) ABSTRACT

An apparatus having an exterior surface that simulates a natural surface, and method of manufacturing same, comprising a polymer-foam sidewall having a concave first surface, a first end, and a second end. According to one embodiment in which the apparatus is a hunting blind, the sidewall is generally cylindrical and further has an inner surface, and defines a plurality of windows extending between the inner and outer surfaces. A first endwall is adjacent to the first end of the sidewall. A second endwall is adjacent to the second end of the sidewall. The sidewall, first end wall, and second endwall define an interior space that may be occupied by a hunter.

11 Claims, 9 Drawing Sheets

(56) References Cited

U.S. PATENT DOCUMENTS

| | | | |
|---|---|---|---|
| 5,791,293 A * | 8/1998 | Northrop et al. | 119/498 |
| 5,911,927 A * | 6/1999 | Roberts | 264/46.4 |
| 5,938,993 A * | 8/1999 | Greene | 264/46.4 |
| 6,033,608 A * | 3/2000 | Reynolds et al. | 264/54 |
| D642,700 S * | 8/2011 | Hunter et al. | D25/7 |
| 8,579,007 B2 * | 11/2013 | Pottmeyer et al. | 160/229.1 |
| 8,846,179 B2 * | 9/2014 | Saucedo | 428/156 |
| 2005/0028854 A1 * | 2/2005 | Erickson et al. | 135/97 |
| 2007/0251561 A1 * | 11/2007 | Lee | 135/114 |
| 2008/0023055 A1 * | 1/2008 | Krampitz | 135/117 |

\* cited by examiner

APPARATUS WITH AN EXTERIOR SURFACE SIMULATING A NATURAL SURFACE AND METHOD OF MANUFACTURE

CROSS-REFERENCES TO RELATED APPLICATIONS

This original nonprovisional application claims the benefit of the filing date of U.S. provisional application Ser. No. 61/682,554, filed Aug. 13, 2012, which is incorporated by reference herein.

STATEMENT REGARDING FEDERALLY-SPONSORED RESEARCH OR DEVELOPMENT

Not applicable.

BACKGROUND OF THE INVENTION

1. Field of the Invention

The present invention relates to apparatuses for outdoor use and having at least one surface designed to simulate the appearance of a natural surface, such as a vegetation surface or rock surface.

2. Background of the Art

In hunting, game are adept at identifying unnatural (e.g., human) motion and sounds, as well as unnatural structures in their environment. One technique used by hunters to counter game's ability to identify unnatural motion and sounds is to use a hunting blind, which is a cover device designed to reduce the chance of detection.

Hunting blinds come in two main varieties. Elevated blinds are positioned above ground, such as within a tree or on a stand. Ground blinds, on the other hand, sit directly on the ground.

Typical ground blinds often require a great deal of preparation and patience prior to use. Because game such as deer are cautious and unaccepting of new and unfamiliar structures, a ground blind might have to be left in the desired hunting location for extended time periods prior to use. In addition, the blind may need to be "brushed in"—that is, brush from the surrounding area gathered to place around the blind so the game does not see the unnatural outline. Not only can this take a significant amount of time, but it must be done frequently, as the foliage on the brush that provides the concealment dies off over time and reduces the amount of cover.

Several devices have been developed to attempt to address these problems. For example, a blind sold under the trademark GHOSTBLIND®, by GhostBlind Industries of Marietta, Ohio, comprises a set of adjacent mirrors that are angled downward toward the ground surface. Thus, the natural appearance of the surrounding ground surface is reflected by the mirrors to the nearby game.

The GHOSTBLIND® blind, however, has several drawbacks. For one, the mirrors are relatively fragile, and cannot be left unattended for extended periods of time without risk of damage. Second, the blind is relatively small, is open to the environment and elements, and does not include aspects for inhibiting the transmission of unnatural sounds and scents. Third, there still remains risk of an unnatural image inadvertently being reflected by one or more misaligned mirrored panels.

Other proposed solutions were arrived at by assignee of this application and are disclosed in U.S. Pat. Nos. D642,700, D652,343, D642,699, and D661,404. For example, D642,699 discloses a tree-like observation blind that has the general shape of a tree trunk. This patent, however, does not simulate a vegetation surface, but rather simply the general outline and shape of a tree. In fact, the design disclosed in D642,699 was determined to be inadequate, which resulted in development of the inventions disclosed and claimed herein.

SUMMARY OF THE INVENTION

The present invention relates to an apparatus having an exterior surface simulating characteristics of a natural surface, such as the bark of the tree, and method of manufacturing same. The apparatus comprises a polymer foam wall having a first end and a second end.

According to one embodiment, the sidewall has an outer surface simulating a vegetation surface, such as the bark on the trunk of a tree. The sidewall further has an inner surface, and defines a plurality of windows extending between the inner and outer surfaces. A first endwall is adjacent to the first end of the sidewall. A second endwall is adjacent to the second end of the sidewall. The sidewall, first endwall, and second endwall define an interior space that may be occupied by a hunter.

In arriving at the present invention, one problem that was addressed was the sheer detail and scope of the subject molded articles. Molding processes that may be similar to those described herein have been used in other areas, such as the field of special effects make-up. There are, however, fundamental differences between using the technique for special effects and in the simulation of natural surfaces.

For example, traditional molding techniques require utilizing an enclosure into which the a curable mixture is poured and allowed to set. With the present invention, however, the scale of the potential subject matter—i.e., full-size trees—generally prevents the efficient use of such enclosures.

In addition, traditional molding techniques are focused on accuracy and detail of the mold at the expense of speed and manufacturing efficiency. While in the present application accuracy is important, the degree of accuracy need not be as precise as in, for example, the special effects industry. Rather, the ability to manage and handle the mold during the manufacturing process is prioritized over the precision required with other areas where silicone molding is required.

DESCRIPTION OF ONE OR MORE EMBODIMENTS OF THE INVENTION

Figure 1:
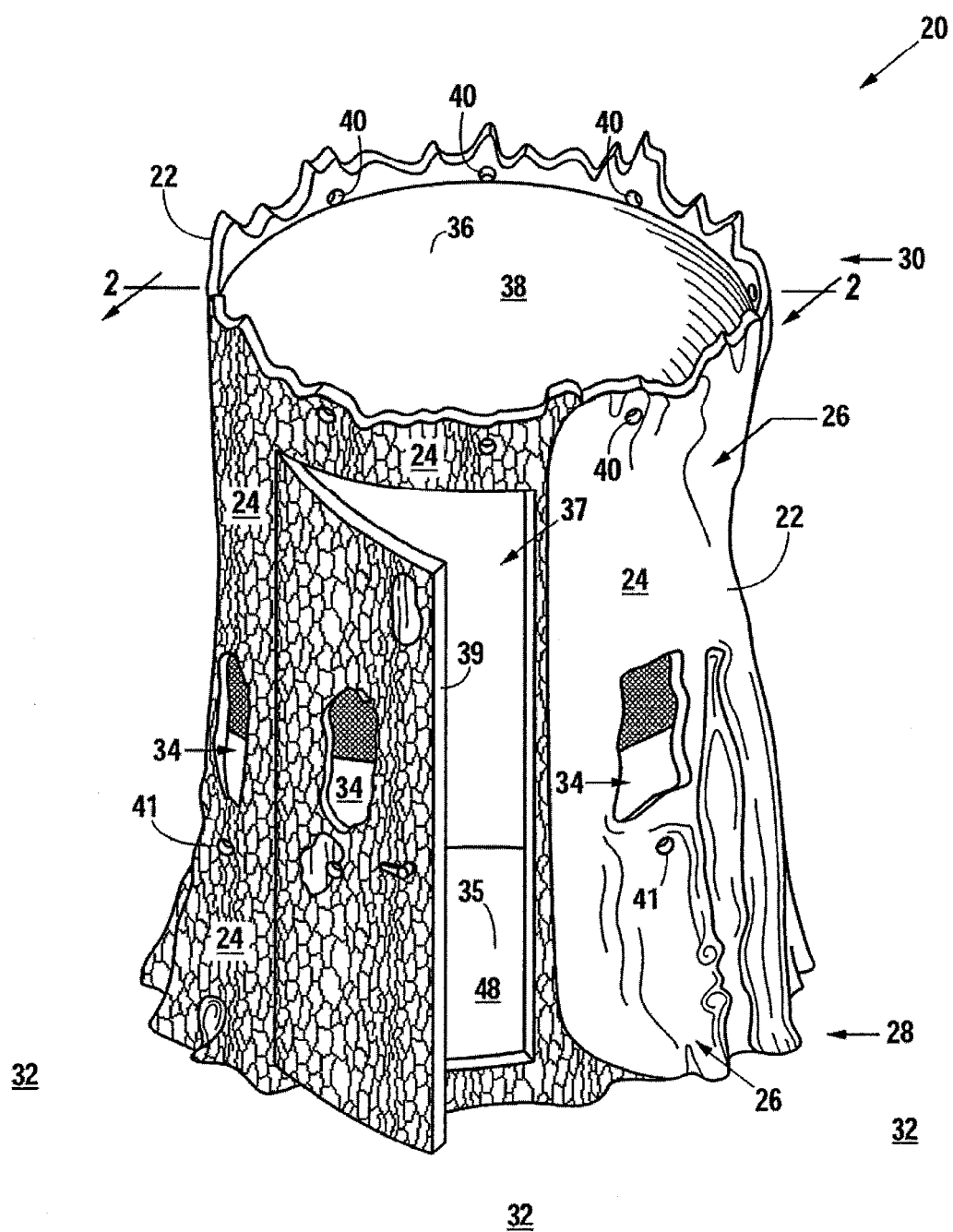
FIG. 1 is a top isometric view of an embodiment of the present invention.

FIG. 1 shows an embodiment of the present invention, which embodiment is a hunting blind 20 that simulates the textures and colors of a subject tree's bark and is manufactured according the steps of the method disclosed herein. The blind 20 comprises a generally trunk-shaped sidewall 22 having an exterior surface 24 that imitates the texture of natural tree bark. This texture may include bare areas 26 that are smooth, such as are frequently found in nature. Such natural textures and shapes generally do not comprise straight lines and right angles. Although the blind 20 is shown as having the bark of an oak tree, any number of different trees may be simulated using the process described herein. The exterior surface 24 of the sidewall 22 is coated with UV protective paint selected to imitate the colors of the bark of the subject tree. One such suitable paint is an exterior latex flat paint, C1 Series, sold under the tradename DURACRAFT by The Sherwin Williams Corporation of Cleveland, Ohio.

The trunk-shaped sidewall 22 includes a first end 28 and a second end 30. In the preferred embodiment as intended to be used, the first end 28 is positioned proximal to a ground surface 32 and is flared to simulate the root flare of a natural tree. The second end 30 is positioned distally from the ground surface 32. Windows 34 are disposed through the sidewall 22 to provide six viewports that are generally spaced equidistantly around the sidewall 22 to provide for generally a three-hundred sixty degree viewing angle. Preferably, the windows 34 are irregularly shaped so as not to use straight lines or right angles.

A door opening 37 extends through the sidewall 22 to provide access to the interior of the blind 20. A door 39 is fastened to the sidewall 22 and is rotatable to and from a closed position which it occupies in the door opening 37.

A first endwall 35 is positioned at the first end 28 of the sidewall 22. A second endwall 36 is positioned at the second end 30 of the sidewall 22. The second endwall 36 has a convex exterior surface 38 that directs liquids (e.g., rainwater) toward channels 40 spaced around the convex surface 38 and through the sidewall 22, which allow liquid to pass through the sidewall 22 and fall to the surrounding ground surface 32, thus preventing damage to the blind 20 from accumulation of liquid. A second group of channels 41 is positioned proximal to each window 34, with each channel extending through the sidewall 22 to the interior of the blind 20. The sidewall 22 extends beyond the concave exterior surface 38 such that the surface is generally not visible to game resting on the surrounding ground surface 32.

Figure 2:
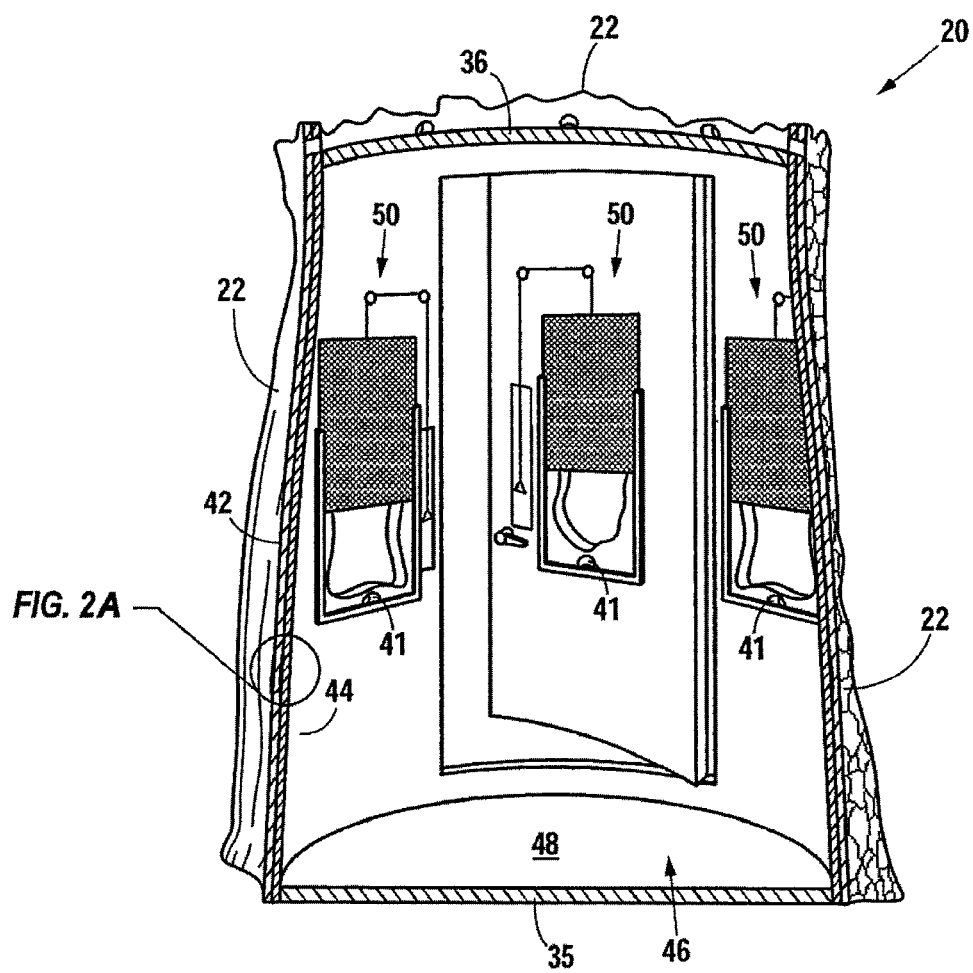
FIG. 2 depicts a sectional view through section line 2-2 of FIG. 1.
Figure 2A:
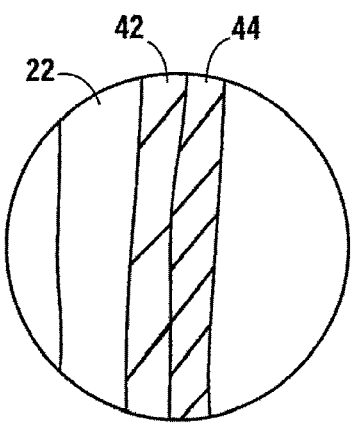
FIG. 2A is an enlarged view of window 2A of FIG. 2.

As shown in FIG. 2 and FIG. 2A, the sidewall 22 is comprised of a first foam layer 42 having a first indention force deflection (IFD) rating of ten pounds, and a second foam layer 44 having a second IFD rating of two pounds. Preferably, the foam is a polymer foam. In this embodiment, the thickness of the sidewall 22 is approximately four inches, with the second foam layer 44 being thicker than the first foam layer 42.

The sidewall 22, first endwall 35, second endwall 36, and door opening 37 define an interior space 46 for isolating an occupant from the environment. More specifically, the interior space 46 is defined by the second layer 44 of the sidewall 22, a floor surface 48, and the second endwall 36. A window assembly 50 is associated with each window 34.

Figure 3A:
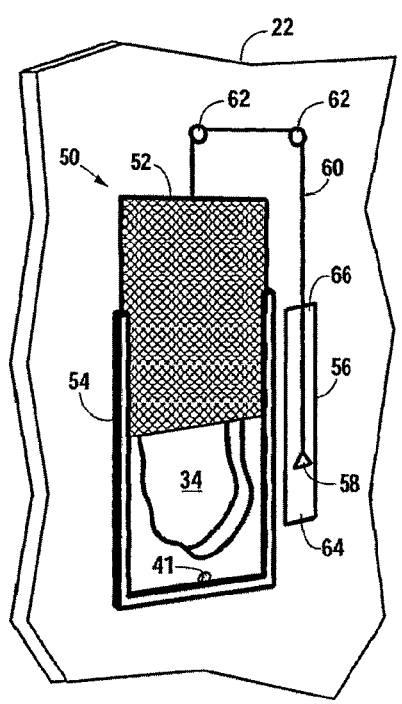
FIGS. 3A & 3B show a window assembly of the embodiment described with reference to FIG. 2 in a substantially open and a substantially closed state, respectively.
Figure 3B:
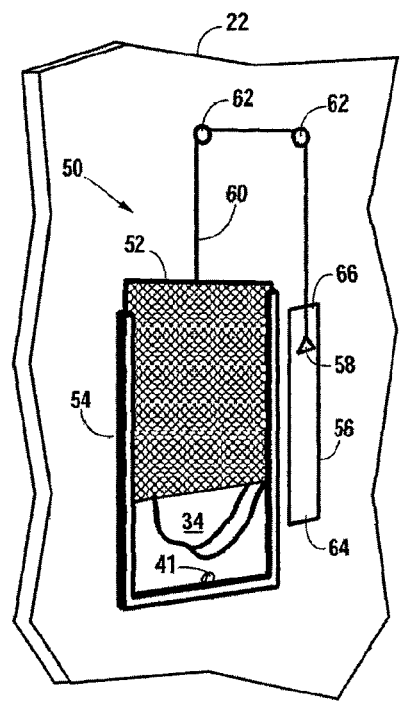

Referring to FIGS. 3A & 3B, each window assembly 50 includes a pane 52, pane frame 54 and metallic member 56 that is associated with each of the windows 34. Each metallic member 56 is generally elongate and positioned proximal to a window 34.

In this embodiment, each pane 52 is one-way glass that allows an occupant of the blind to see through the pane 52, but impedes game from seeing movement by the occupant within the interior space. In alternative embodiments, a semi-transparent decal (e.g., a camouflage window decal) may be applied to the panes 52. The frame 54 and sidewall 22 define slots on opposing sides of the window 34 that guides the pane 52 as it slidably moves to and from a closed position. Channels 41 extend through the sidewall 22 and have openings positioned proximal to the frame 54 to inhibit fluid accumulation in the frame 54.

Each pane 52 is connected to a magnetic member 58 (e.g., a neodymium magnet) with a length of cordage 60 (e.g., rope, string) that is positioned through eyebolts 62 or pulleys that are mounted to the sidewall 22. The magnetic member 58 is attracted to the metallic member 56 with sufficient strength to resist the force applied to the magnetic member 58 by the weight of the pane 52 transferred through cordage 60. Each pane 52 may be moved between an open and a closed position (and positions in between) by moving the position of the magnetic member 58 to various positions on the associated metallic member 56. When the magnetic member 58 is positioned at or near a first end 64 of the metallic member 56, the pane 52 is held in an open or substantially open position. When the magnetic member 58 is moved to a position at or near the second end 66 of the metallic member 56, the pane 52 moves to the closed, or a substantially closed, position.

The method of manufacturing the blind described with reference to the previous figures is a generally a two-step process. First, a master mold is made. Second, the blind 20 is manufactured from the master mold.

Making the master mold comprises the follows steps. First, a subject tree is identified. The subject tree should have an outer trunk surface (e.g., bark) that will remain intact during the mold-creation process. The bark should be relatively new and supple, as older and/or brittle bark will become inadvertently distressed or removed during later steps of the mold-making process. Importantly, however, while older, brittle bark will not suffice for the methodology presented herein, a tree section may be too supple to accept the silicone mixture without deformation.

Figure 4:
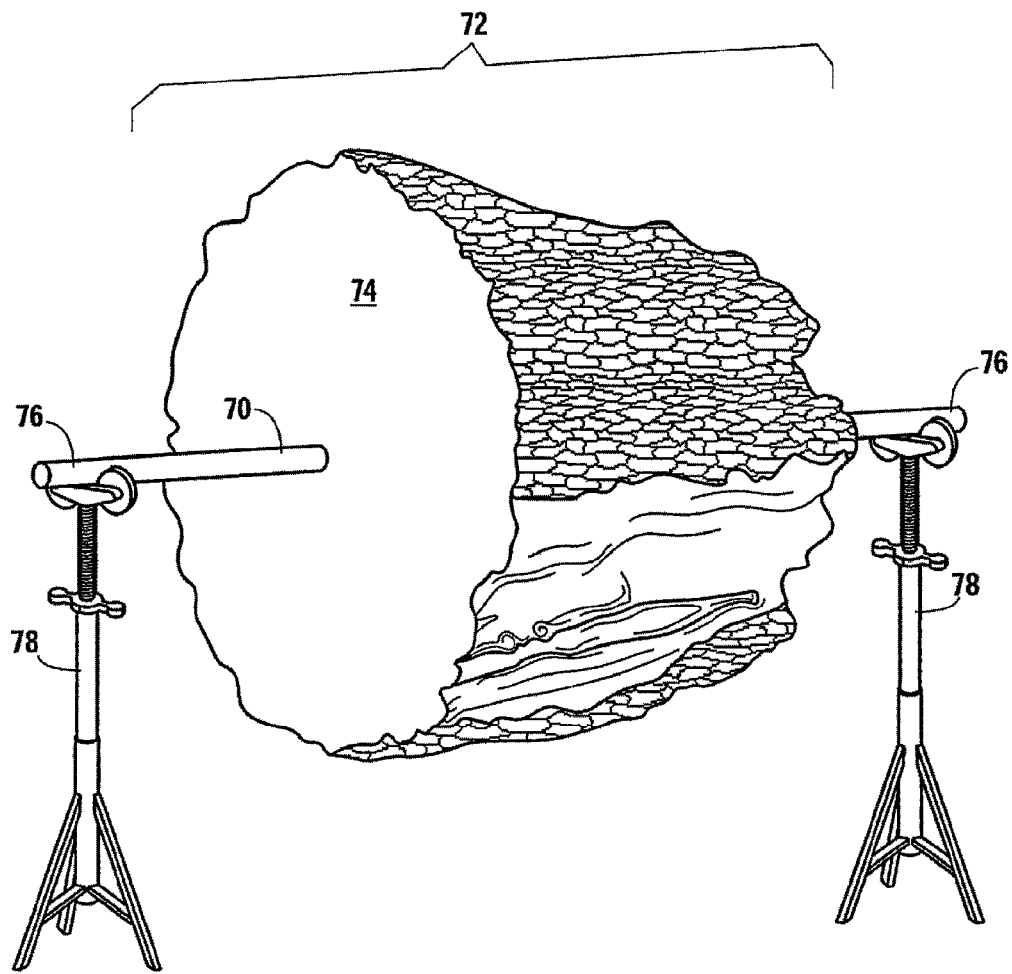
FIGS. 4-8 show various stages of one embodiment being manufactured according to the method of manufacture of the present invention.

Second, a trunk section of the subject tree is cut. If the subject tree has a natural root flare proximal to the ground surface, the trunk section preferably includes the root flare. The length of the trunk section should be at least equal to the desired maximum exterior height of the blind. As shown in FIG. 4, the trunk section 72 is preferably cut to have parallel, planar surfaces 74, which may or may not have irregular profiles depending on the characteristics of the selected trunk section 72.

Third, as shown in FIG. 4, a spindle 70 having opposing ends 76 is disposed through the trunk section 72. Preferably, the spindle 70 is disposed at a right angle relative to the planar surfaces 74 of the trunk section 72 and through the center of mass to allow even rotation of the trunk section 72 during later steps of the process. The opposing ends 76 of the spindle 70 are supported by elevated rollers 78, which allows the spindle 70 to turn freely in this position.

Fourth, when the trunk section 72 is in the position shown in FIG. 4, a release agent is applied to the trunk section 72. A suitable release agent repels water, and, for example, is petrol-based. Preferably, the release agent is vegetable oil, but may be any other suitable agent. The release agent is applied to the trunk section 72 with a cloth, brush, or other suitable applicator.

Fifth, while the trunk section 72 is rotated in the position shown in FIG. 4 a first coat of a low viscosity silicone mixture having a high Shore value is applied. Preferably, the Shore value is greater than or equal to twenty-eight and the viscosity of thirty-thousand cps. One suitable silicone is Model HY628# available from Shenzhen Hongyejie Technology Co., Ltd. of Shenzhen, China.

Fifth, after allowing the first coat to dry, and while the trunk section 72 is rotated in the position shown in FIG. 4, a second coat of the low viscosity silicone mixture used for the first coat is applied. Preferably, the second coat is applied with the same silicone mixture as is applied as the first coat.

Sixth, a coat of a second silicone mixture, which has a higher viscosity than the first silicone mixture, is applied. Preferably, application of the second silicone mixture occurs when the trunk section 72 is in a vertical position rather than the horizontal position shown in FIG. 4. The second silicone mixture may be derived from the first silicone mixture being combined with a thickening agent and/or a suitable accelerant to decrease cure time.

Seventh, a layer of barrier material is applied over the second silicone mixture. Preferably, the barrier layer is a cotton fabric, such as a cheesecloth, which is a loose-woven gauze-like cotton cloth.

Eighth, a coat of a third silicone mixture is applied over the layer of barrier material. Preferably, the third silicone mixture is the same as the first silicone mixture previously applied.

Figure 5:
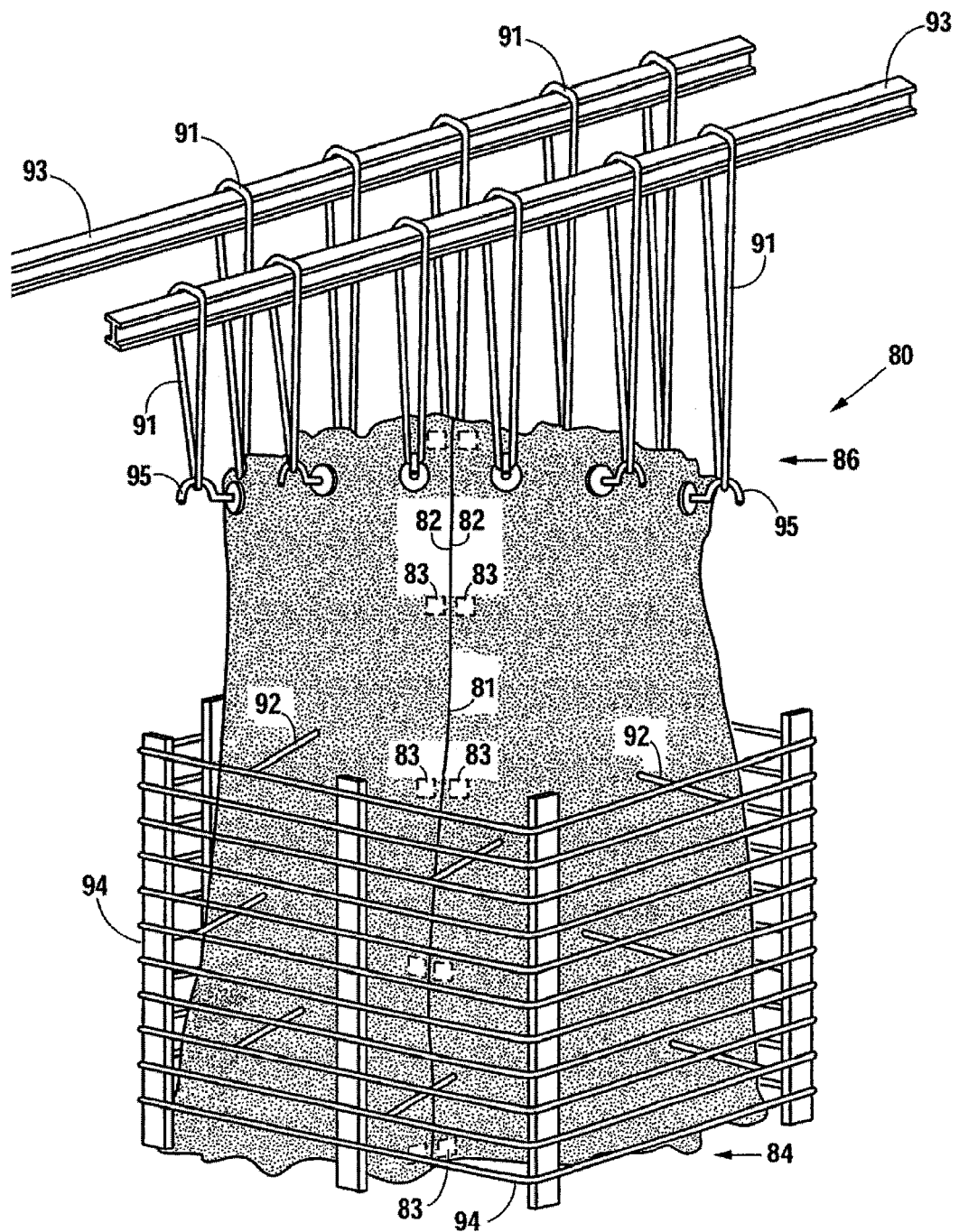

Ninth, as shown in FIG. 5, attachment members 95 for hanging the master mold from an overhead support are attached to at least one of the silicone mixture layers. In the described embodiment, the attachment members 95 are fully immersed in at least one silicone layer. Once the silicone layers have cured, the attachment members 95 are impeded from movement relative to the remainder of the master mold 80 and will support the weight of the master mold 80 without detaching.

After the steps identified supra are completed, the composite layers of the master mold are inspected for defects in the silicone, such as spots or tears, and patched as needed with the high viscosity silicone mixture.

Still referring to FIG. 5, a seam 81 is formed between the first and second ends 84, 86 of the master mold 80, which define opposing seam ends 82. Straps or magnets 83 are fused with silicone near the seam ends 82 to allow for later reconnection of the seam ends 82. Thereafter, the master mold 80 is removed from the trunk section (not shown) by separating the seam ends 82.

Figure 6:
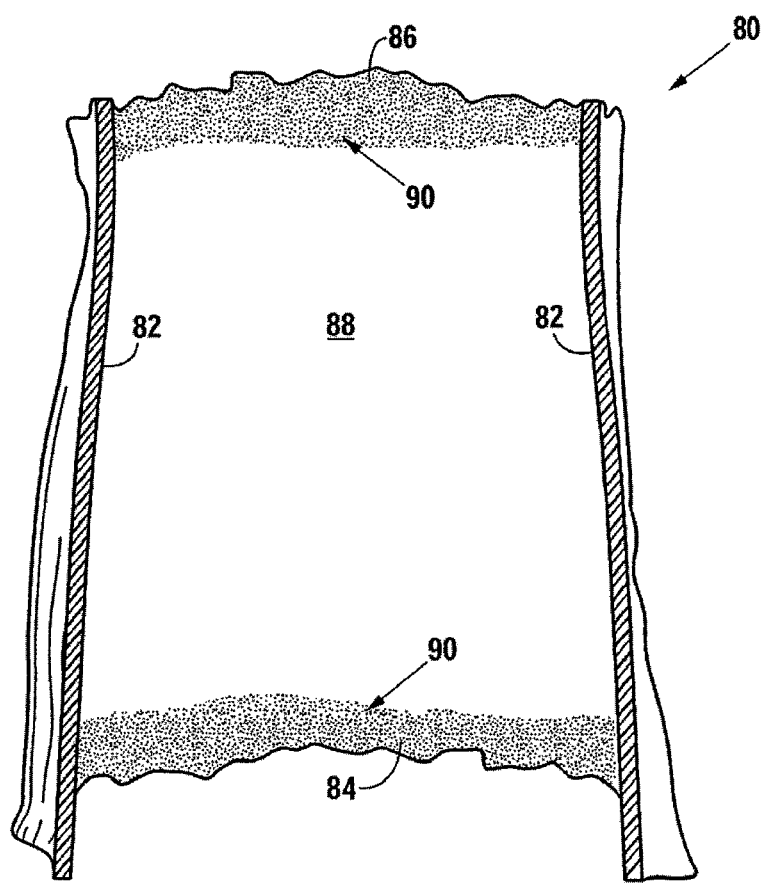

Referring to FIG. 6, which shows the master mold 80 with the seam ends 82 unconnected, areas proximal to the opposing ends 84, 86 of the interior surface 88 of the master mold 80 are coated with an elastomer 90 (e.g., polyurea) to improve durability. The elastomer coating 90 is applied along the opposing ends 84, 86 of the master mold 80. This polyuria elastomer coating 90 hardens these areas to inhibit chipping, breaking, or other damage of the master mold 80.

While the preferred method contemplates applying the silicone mixtures to a trunk section, an alternative embodiment of the method contemplates a "flat pour." According to this alternative embodiment, the exterior surface of the identified trunk section (i.e., the phellum) is removed and kept intact. Typically, this is done by removing the entire bark layer, which includes the phellum (or cork), the phellogen (or cork cambium), the phelloderm, the cortex, and the phloem.

After completion of the master mold 80, an individual blind may be manufactured as follows. First, referring back to FIG. 5, the master mold 80 is hung from overhead supports 93 by chains or ropes 91 to the attachment members 95, and stretched to the desired form using cordage 92 connected between the master mold 80 and a support framework 94. The desired shape is a generally tree-trunk shaped cylinder having open ends that is at least substantially similar to the shape of the trunk section from which the master mold 80 was formed. Once the desired form for the master mold 80 is obtained, the seam ends 82 are closed by connecting the magnets 83 or straps.

Figure 7:
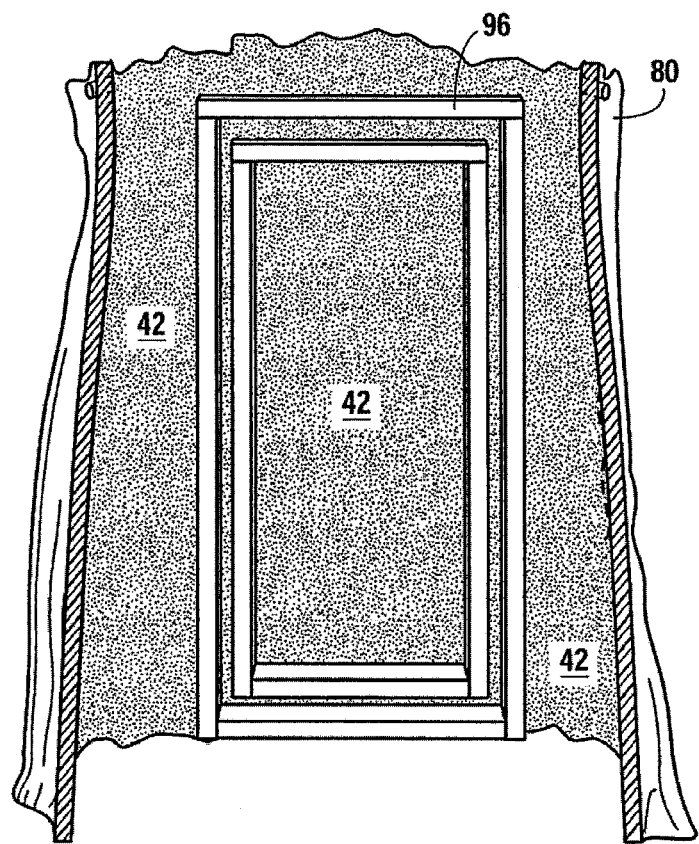

Thereafter, as shown in FIG. 7, the first foam layer 42 is applied (e.g., sprayed, stamped, poured, etc.) on the inner surface of the master mold 80. After the first foam layer 42 cures, a door frame 96 is fastened to the first foam layer 42, and foam applied therearound to secure the door frame 96 in place relative to the first foam layer 42. In this embodiment, the first foam layer 42 has an IFD of ten pounds. One suitable B-side component is a urethane system resin component sold under the designation High Density Foam 1006 Resin, available from PolyGreen Solutions, LLC of Atlanta, Ga. This B-side component may be combined with a polymethylene polyphenylisocyanate A-side component designated PM 200, also available from PolyGreen Solutions, LLC.

After the first foam layer 42 has cured, the second foam layer 44 (see FIG. 2A) is applied to the inner surface of the first foam layer 42. The second foam layer 44 has an IFD of two pounds. One acceptable B-side foam component for the second foam layer 44 is a urethane system resin component sold under the designation Wall Foam 186 Resin, which is available from PolyGreen Solutions, LLC of Atlanta, Ga.

Figure 8:
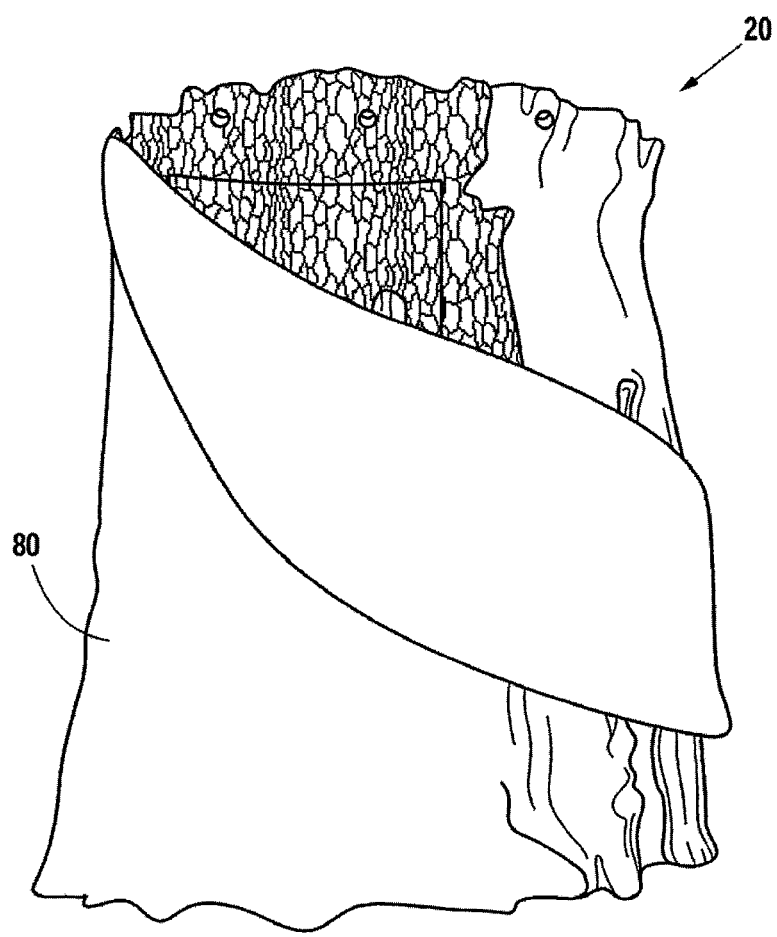

The first and second foam layers 42, 44 together are approximately four inches thick. After the second foam layer 44 has cured, the master mold 80 may be lowered from the overhead supports 93, and the master mold 80 separated at the seam 81, leaving behind the blind 20, as shown in FIG. 8.

A typical embodiment of a blind has the following specifications: (a) exterior height of eighty-eight inches (b) exterior diameter of seventy-seven inches (c) an interior height of seventy-eight inches; (d) interior diameter of sixty-seven inches; and (e) a weight of three hundred pounds. Among other advantages, these dimensions allow a bow hunter adequate space to fully draw the string of a typical bow.

The blind also provides sound and temperature insulating benefits as well. Data shows that the insulating layer of foam provides a temperature differential of +31 degrees (F.) (relative to the exterior of the blind) in the winter, and −16 degrees (F.) (relative to the exterior) during the summer. The insulating layer foam further inhibits sound transmission from the interior space to the surrounding environment.

Figure 9:
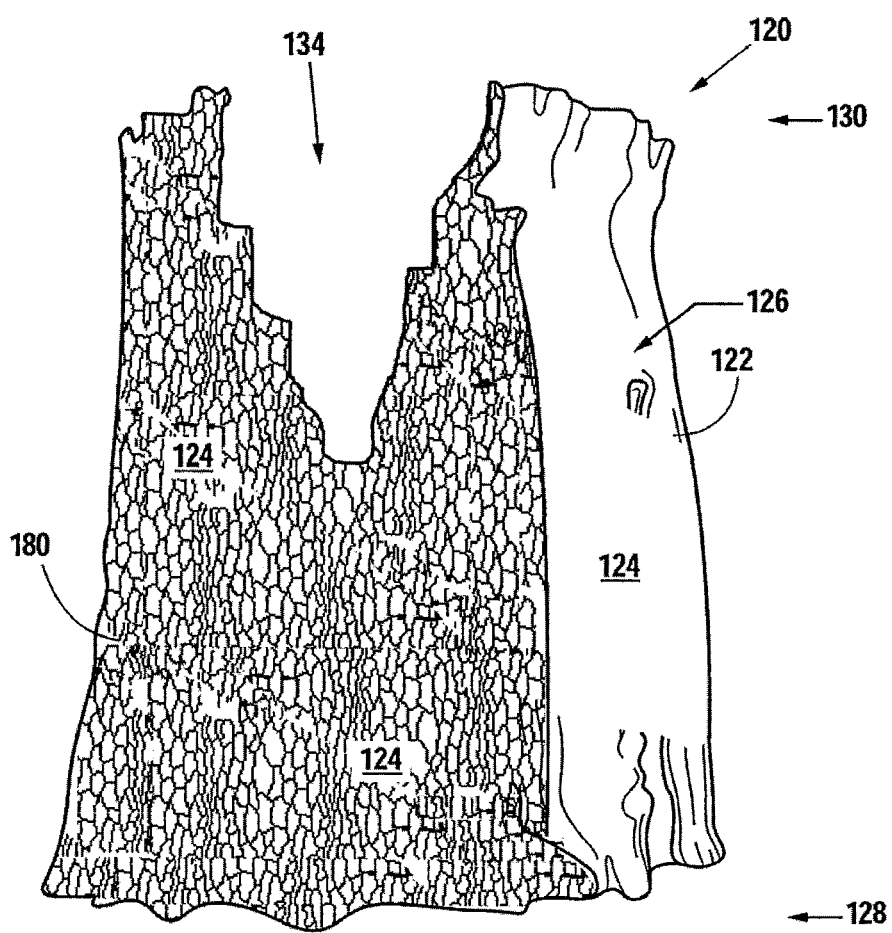
FIG. 9 is a front elevation of an alternative embodiment of the present invention.

FIG. 9 shows another embodiment of an apparatus having the features of the present invention, which embodiment is a hunting blind 120 that simulates the textures and colors of a subject tree's bark. The blind 120 comprises a generally trunk-shaped sidewall 122 having an exterior surface 124 that imitates the texture of natural tree bark, except that the sidewall is not generally-cylindrically shaped. This texture may include bare areas 126 that are smooth, such as are frequently found in nature. Such natural textures and shapes generally do not comprise straight lines and right angles. Although the blind 120 is shown as having the bark of an oak tree, any number of different trees may be simulated using the process described herein. The exterior surface 124 of the sidewall 122 is coated with UV protective paint that is selected to imitate the colors of the bark of the subject tree.

The trunk-shaped sidewall 122 includes a first end 128 and a second end 130. In the preferred embodiment as intended to be used, the first end 128 is positioned proximal to a ground surface 132 and is flared to simulate the root flare of a natural tree. The second end 130 is positioned distally from the ground surface 132. A window 134 is disposed through the sidewall 122 to provide a viewport. Preferably, the window 134 is irregularly shaped so as not to use straight lines or right angles.

The present disclosure includes preferred or illustrative embodiments in which a specific blind and method of manufacturing are described. Alternative embodiments of such a blind and method can be used in carrying out the invention as claimed and such alternative embodiments are limited only by the claims themselves. For example, while the specific embodiments described herein related to hunting blinds, the method of the present invention may be used for planters, bird feeders, and the like. Moreover, in addition to vegetation, the simulated natural surface may include various other surfaces, such as rocks. Other aspects and advantages of the present invention may be obtained from a study of this disclosure and the drawings, along with the appended claims.

I claim:

1. A method of manufacturing an apparatus, the method comprising:
   selecting a natural surface;
   applying a releasing agent to the natural surface;
   applying at least one coat of a first silicone mixture over the releasing agent, said first silicone having a first viscosity;
   applying a second silicone mixture over the at least one coat of said first silicone mixture, said second silicone mixture having a second viscosity;
   applying a layer of barrier material over the second silicone mixture;
   applying a third silicone mixture over the layer of barrier material, wherein said at least one coat of said first silicone mixture, said coat of said second silicone mixture, said layer of barrier material, and said coat of said third silicone mixture comprise a mold composite having a first end and a second end;
   fixing suspension points to a portion of the mold composite;
   forming a seam having opposing seam ends from the first end of the mold composite to the second end of the mold to define seam ends;
   removing the mold from the natural surface; and
   fixing seam attachment points into the seam ends.

2. The method of claim 1 wherein said natural surface is the surface of a trunk section of a subject tree.

3. The method of claim 2 further comprising the step of disposing a spindle through the trunk section.

4. The method of claim 2 wherein said natural surface is an exterior surface of a trunk section, and further comprising the steps of:
   removing the exterior surface from the trunk section; and
   placing the exterior surface on a generally planar surface.

5. The method of claim 1 wherein the viscosity of the second silicone mixture is greater than the viscosity of the first silicone mixture.

6. The method of claim 1 further comprising the steps of:
   suspending said mold composite by said suspension points from an overhead structure;
   connecting the seam ends to close the mold;
   applying at least one layer of polyurea proximal to the first end of the mold;
   applying a second layer of polyurea proximal to the second end of the mold; and
   applying a layer of polymer foam to an interior surface of said mold composite.

7. An apparatus prepared by a process of:
   applying a releasing agent to a natural surface;
   applying at least one coat of a first silicone mixture over the releasing agent;
   applying a coat of a second silicone mixture that has a viscosity higher than the viscosity of the first silicone mixture;
   applying a layer of barrier material over the coat of said second silicone mixture;
   applying a coat of a third silicone mixture over the layer of barrier material, wherein said at least one coat of said first silicone mixture, said coat of said second silicone mixture, said layer of barrier material, and said coat of said third silicone mixture compose a mold composite having a first end, a second end, and an interior surface corresponding the natural surface;
   removing the mold composite from the natural surface;
   applying a first layer of polyurea proximal to the first end of the mold composite;
   applying a second layer of polyurea proximal to the second end of the mold composite;
   applying a first layer of polymer foam to the interior surface of the mold composite; and
   applying a second layer of polymer foam to the interior surface of the first layer of polymer foam.

8. The apparatus prepared by the steps of claim 7 and the following step:
   fixing a door frame to the foam.

9. An apparatus prepared by a process of:
   applying a releasing agent to a natural surface;
   applying at least one coat of a first silicone mixture over the releasing agent;
   applying a coat of a second silicone mixture that has a viscosity higher than the viscosity of the first silicone mixture;
   applying a layer of barrier material over the coat of said second silicone mixture;
   applying a coat of a third silicone mixture over the layer of barrier material, wherein said at least one coat of said first silicone mixture, said coat of said second silicone mixture, said layer of barrier material, and said coat of said third silicone mixture compose a mold composite having a first end, a second end, and an interior surface corresponding the natural surface;
   removing the mold composite from the natural surface;
   applying a first layer of polymer foam to the interior surface of the mold composite;
   applying a second layer of polymer foam to the interior surface of the first layer of polymer foam;
   fixing suspension points to at least one layer of the mold composite;
   forming a seam from the first end of the mold composite to the second end of the mold composite, the seam having opposing seam ends;
   fixing attachment members into the opposing seam ends;
   suspending said mold from an overhead structure; and
   connecting the seam ends to close the mold composite in a generally-cylindrical geometry.

10. The apparatus of claim 7 wherein the natural surface is an exterior surface of a trunk section, and said apparatus is prepared by the further step of placing the exterior surface on a generally planar surface.

11. The apparatus of claim 7 wherein the natural surface is an exterior surface of a trunk section, and said apparatus is prepared by the further step of:
   removing the exterior surface from the trunk section.

* * * * *